(12) United States Patent
Jiang

(10) Patent No.: US 9,244,594 B2
(45) Date of Patent: Jan. 26, 2016

(54) ELECTRONIC APPARATUS AND METHOD FOR INTERACTING WITH APPLICATION IN ELECTRONIC APPARATUS

(71) Applicant: TENCENT TECHNOLOGY (SHENZHEN) COMPANY LIMITED, Shenzhen, Guangdong (CN)

(72) Inventor: Yansheng Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/416,915

(22) PCT Filed: Jul. 16, 2013

(86) PCT No.: PCT/CN2013/079425
§ 371 (c)(1),
(2) Date: Jan. 23, 2015

(87) PCT Pub. No.: WO2014/015749
PCT Pub. Date: Jan. 30, 2014

(65) Prior Publication Data
US 2015/0193095 A1 Jul. 9, 2015

(30) Foreign Application Priority Data
Jul. 24, 2012 (CN) .......................... 2012 1 0257616

(51) Int. Cl.
*G06F 3/0482* (2013.01)
*G06F 3/0484* (2013.01)
(Continued)

(52) U.S. Cl.
CPC ............ *G06F 3/0482* (2013.01); *G06F 3/0484* (2013.01); *G06F 3/0488* (2013.01); *G06F 3/04817* (2013.01); *G06F 3/04842* (2013.01); *G06F 3/04883* (2013.01)

(58) Field of Classification Search
CPC .................................................. G06F 3/0482

USPC .......................................................... 715/810
See application file for complete search history.

(56) References Cited

U.S. PATENT DOCUMENTS

| 8,407,613 B2* | 3/2013 | Hope ................... G06F 3/04817 715/764 |
| 2005/0212753 A1* | 9/2005 | Marvit .................... G06F 3/017 345/156 |

(Continued)

FOREIGN PATENT DOCUMENTS

| CN | 101676849 A | 3/2010 |
| CN | 102385475 A | 3/2012 |

(Continued)

OTHER PUBLICATIONS

International Search Report for PCT/CN2013/079425, ISA/CN, Beijing, mailed Oct. 17, 2013, in Chinese and English (4 pages).

(Continued)

*Primary Examiner* — Reza Nabi
(74) *Attorney, Agent, or Firm* — Harness, Dickey & Pierce, P.L.C.

(57) ABSTRACT

Embodiments of the present disclosure may provide a method for interacting with an application and an electronic apparatus. When an electronic apparatus detects that a to-be-operated object in an application is selected, the electronic apparatus may display a selection identifier. The electronic apparatus may detect whether an input track is generated. The electronic apparatus may determine an operation type corresponding to the input track when the electronic apparatus detects the input track and detects that the input track ends. The electronic apparatus may operate the to-be-operated object according to the operation type.

10 Claims, 4 Drawing Sheets

(51) Int. Cl.
*G06F 3/0488* (2013.01)
*G06F 3/0481* (2013.01)

(56) References Cited

U.S. PATENT DOCUMENTS

| | | | | |
|---|---|---|---|---|
| 2005/0212760 A1* | 9/2005 | Marvit | G06F 1/1613 | 345/156 |
| 2005/0212767 A1* | 9/2005 | Marvit | G06F 1/1626 | 345/158 |
| 2008/0168404 A1 | 7/2008 | Ording | | |
| 2009/0262091 A1 | 10/2009 | Ikeda et al. | | |
| 2010/0013780 A1* | 1/2010 | Ikeda | G06F 3/04883 | 345/173 |
| 2010/0306705 A1* | 12/2010 | Nilsson | G06F 3/0488 | 715/835 |
| 2011/0041096 A1* | 2/2011 | Larco | G06F 3/0482 | 715/835 |
| 2011/0193782 A1* | 8/2011 | Shiu | G06F 1/1626 | 345/168 |
| 2012/0092268 A1 | 4/2012 | Tsai et al. | | |
| 2012/0133677 A1 | 5/2012 | Suzuki et al. | | |
| 2012/0268246 A1* | 10/2012 | Liu | G06F 21/32 | 340/5.82 |
| 2012/0290946 A1* | 11/2012 | Schrock | G06Q 10/107 | 715/752 |
| 2013/0002542 A1* | 1/2013 | Ishida | G06F 3/0416 | 345/156 |
| 2013/0263029 A1* | 10/2013 | Rossi | G06F 3/04883 | 715/764 |
| 2013/0275924 A1* | 10/2013 | Weinberg | G06F 3/017 | 715/863 |
| 2013/0335335 A1* | 12/2013 | Neelakant | G06F 3/04883 | 345/173 |
| 2014/0157182 A1* | 6/2014 | Kim | G06F 3/0482 | 715/780 |
| 2014/0191972 A1* | 7/2014 | Case | G06F 3/017 | 345/168 |
| 2014/0201663 A1 | 7/2014 | Takeda | | |
| 2014/0282150 A1* | 9/2014 | Wagner | G06F 3/04883 | 715/765 |
| 2014/0320434 A1* | 10/2014 | Pantel | G06F 3/017 | 345/173 |
| 2015/0046867 A1* | 2/2015 | Moore | G06F 3/0481 | 715/781 |

FOREIGN PATENT DOCUMENTS

| | | |
|---|---|---|
| EP | 0660218 A1 | 6/1995 |
| EP | 2306289 A2 | 4/2011 |
| JP | 2004-206732 A | 7/2004 |
| JP | 2010015239 A | 1/2010 |
| JP | 2011-238200 A | 11/2011 |
| JP | 4943553 B1 | 5/2012 |
| JP | 2012-113600 A | 6/2012 |

OTHER PUBLICATIONS

English translation of the Written Opinion of the ISA, ISA/CN, mailed Oct. 17, 2013 (6 pages).
Japanese Office Action for Application No. 2015-523394 dated Jun. 23, 2015, and its English translation thereof.
XP-002474183 iPhone User's Guide 2007.
Extended European Search Report for Application No. 13823765.6 dated Jun. 25, 2015.
International Preliminary Report for International Application No. PCT/CN2013/079425 dated Feb. 5, 2015.

* cited by examiner

ELECTRONIC APPARATUS AND METHOD FOR INTERACTING WITH APPLICATION IN ELECTRONIC APPARATUS

CROSS REFERENCE TO RELATED APPLICATIONS

This application is a 371 U.S. National Stage of International Application No. PCT/CN2013/079425, filed on Jul. 16, 2013. This application claims priority to Chinese Patent Application No. 201210257616.8, entitled "ELECTRONIC APPARATUS AND METHOD FOR INTERACTING WITH APPLICATION IN ELECTRONIC APPARATUS", filed on Jul. 24, 2012. The entire disclosures of each of the above applications are incorporated herein by reference.

FIELD OF THE DISCLOSURE

The present disclosure relates to a computer technology field, and more particularly, to a method for interacting with an application in an electronic apparatus and an electronic apparatus.

BACKGROUND

When a user interacts with an application of an electronic apparatus, a function icon or button may be displayed on the electronic apparatus. Therefore, the user may interact with the application via operating the function icon or button. Taking a smartphone for example, different function buttons are set for different applications on the smartphone, such as a micro-blog application, an E-mail or a Social Networking Site (SNS). Taking the micro-blog application for example, a "repost" icon, a "comment" icon and a "bookmark" icon, etc., may be displayed on an interface of the micro-blog application. For instance, if a user wants to execute a function, such as repost a piece of micro-blog, the user needs to click and select the to-be-reposted micro-blog with his/her finger or a touch pen. Then, the finger of the user or the touch pen is temporarily moved away from the interface of the micro-blog application. Then, the user may re-click and re-select the "repost" icon via his/her finger or the touch pen to call out a reposting operation interface to repost the micro-blog.

SUMMARY

Embodiments of the present disclosure may provide a method for interacting with an application in an electronic apparatus and an electronic apparatus, to simplify an interaction operation between a user and an application, provide a simple and easy-to-operate display interface and extend the application to implement more functions.

Embodiments of the present disclosure may adopt following technical schemes.

An embodiment of the present disclosure may provide a method for interacting with an application in an electronic apparatus, including:

detecting, by an electronic apparatus, whether a to-be-operated object in an application is selected;

displaying, by the electronic apparatus, a selection identifier when the electronic apparatus detects that the to-be-operated object in the application is selected;

detecting, by the electronic apparatus, whether an input track is generated;

determining, by the electronic apparatus, an operation type corresponding to the input track when the electronic apparatus detects the input track and detects that the input track ends; and operating, by the electronic apparatus, the to-be-operated object according to the operation type.

Another embodiment of the present disclosure may provide an electronic apparatus, including:

a detection module, to detect whether a to-be-operated object in an application is selected and detect whether an input track is generated;

a display module, to display a selection identifier when the detection module detects that the to-be-operated object in the application is selected;

a determination module, to determine an operation type corresponding to the input track when the detection module detects the input track and detects that the input track ends; and an execution module, to operate the to-be-operated object according to the operation type.

With the above technical scheme, the user may need to select the to-be-operated object and draw the input track on the electronic apparatus via touch input or mouse click and slide input. The electronic apparatus may determine the operation type corresponding to the input track and execute the operation corresponding to the operation type to interact with the application after the electronic apparatus detects that the input track ends.

It can be seen that the above technical scheme may provide a new interaction method. With this interaction method, the user needs not to search for the function icon or button corresponding to the operation. The user may need to input a track corresponding to a wished function operation via touch input on the touch screen or via the mouse input. This technical scheme may solve the problem that since an application may provide too many function icons or buttons, when all of these function icons or buttons cannot be displayed on the first-level menu of the display interface of the application, the user can select the needed function icon via multiple click and search operations.

BRIEF DESCRIPTION OF THE DRAWINGS

In order to clearly describe the technical scheme in the present disclosure, a brief description is given to accompanying figures used in following examples. Obviously, the accompanying figures described hereinafter are some examples in the present disclosure. An ordinary skilled in the art may obtain other figures with these accompanying figures without creative work.

DETAILED DESCRIPTION

When an application provides icons or buttons with different functions, since the size of a display area of the electronic apparatus is limited, main function icons are displayed on the display area (equivalent to a first-level menu). Other secondary function icons or buttons are set in a second-level menu or a third-level menu. For instance, three function icons, i.e. the "repost" icon, "comment" icon and "bookmark" icon and a "more" icon are usually displayed on the display interface of the micro-blog application. Other function icons, such as a "report" icon may be displayed on the second-level menu. That is, when the user clicks the "more" icon, the "report" icon may be displayed on the second-level menu.

It can be seen from the above that when the user interacts with the application on the electronic apparatus, if an application provides many function icons or buttons and not all of these function icons or buttons can be displayed on the first-level menu, the user may need to select a wished function icon via multiple click operations, which makes the operation method more complicated.

The present disclosure is further described in detail hereinafter with reference to the accompanying drawings to clearly and completely describe the technical scheme of the present disclosure. Obviously, the embodiments are partial of the present disclosure and are not all the embodiments. Any other embodiments made by an ordinary skilled in the art of the present disclosure based on the embodiments of the present disclosure without creative work are protected by the present disclosure.

This embodiment of the present disclosure may provide a method for interacting with an application in an electronic apparatus. The application may be installed on the electronic apparatus. The electronic apparatus may be an apparatus with a touch screen, such as a mobile phone, a tablet PC and a Media Player 4 (MP4) and a vehicle-mounted terminal. The electronic device may support input of a user via the touch screen. The electronic apparatus may be a desktop computer. The desktop computer may have a mouse access interface and support input of the user via a mouse. The application may be Instant Messaging (IM), a micro-blog application, E-mail, a Social Networking Site (SNS) or an application adopting Really Simple Syndication (RSS), etc.

Figure 1:
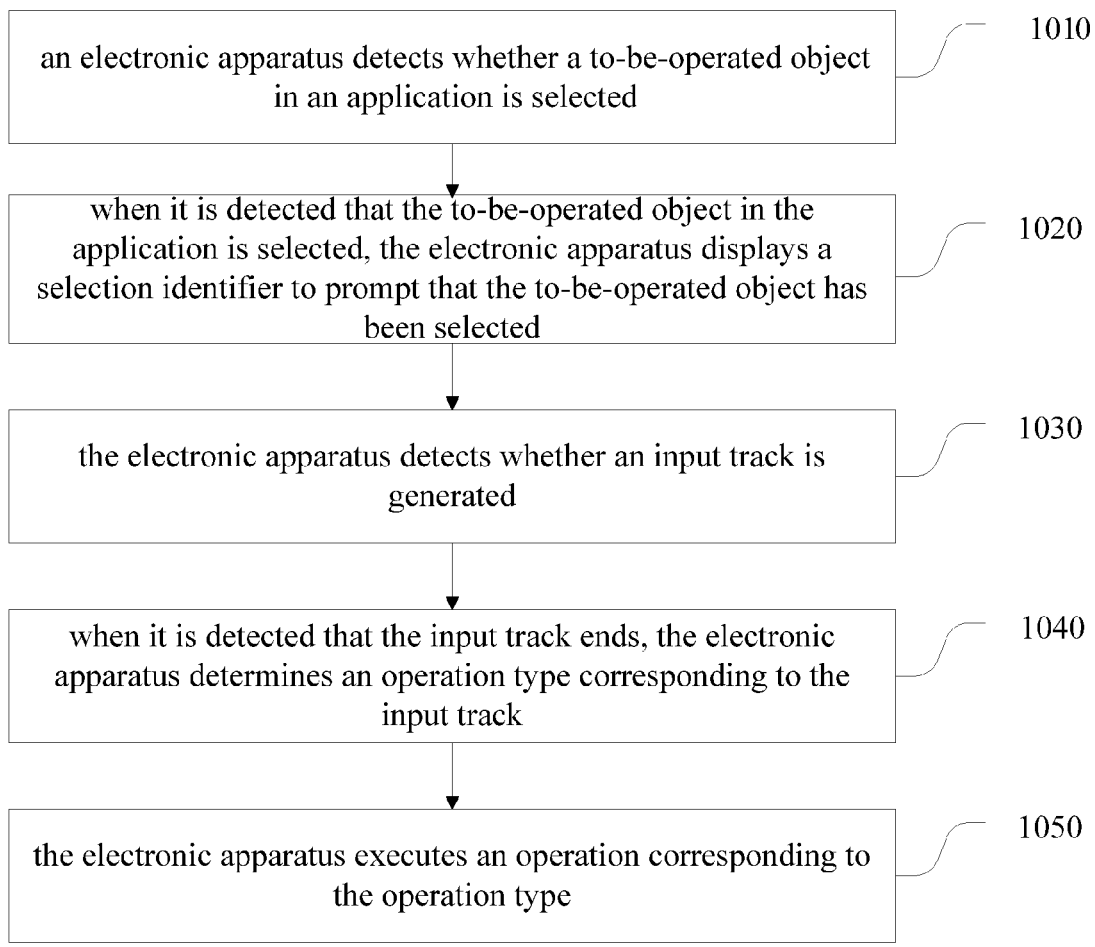
FIG. 1 is flow chart illustrating a method for interacting with an application in an electronic apparatus in accordance with various embodiments of the present disclosure.

As shown in FIG. 1, an embodiment of the present disclosure provides a method for interacting with an application in an electronic apparatus. The method may include following blocks.

In block 1010, an electronic apparatus detects whether a to-be-operated object in an application may be selected.

For instance, when the application is a micro-blog application, the to-be-operated object may be a piece of micro-blog. When the application is an E-mail, the to-be-operated object may be an E-mail. When the application is an SNS, the to-be-operated object may be a piece of news or a piece of information.

It should be noted that if the electronic apparatus (for instance, a mobile phone supporting a touch operation) supports touch input, a user may select the to-be-operated object in the application by touching and clicking the to-be-operated object in the application. If the electronic apparatus (for instance, a computer) is equipped with a mouse, the user may select the to-be-operated object via clicking the to-be-operated object via the mouse.

In block 1020, when it is detected that the to-be-operated object in the application is selected, the electronic apparatus may display a selection identifier to prompt that the to-be-operated object has been selected.

When it is detected that the to-be-operated object in the application is selected, the electronic apparatus may draw and display a rectangle outside an area of the selected to-be-operated object.

In block 1030, the electronic apparatus may detect whether an input track is generated.

The input track may be a track generated via touch input on the electronic device or a track generated by click and slide input on the electronic apparatus by the mouse.

In block 1040, when it is detected that the input track ends, the electronic apparatus may determine an operation type corresponding to the input track.

In practice, the electronic apparatus may search for the operation type using the input track according to a pre-stored corresponding relationship between the input track and the operation type.

In block 1050, the electronic apparatus may execute an operation corresponding to the operation type.

In this block, the electronic apparatus may operate the to-be-operated object according to the operation type.

With the above technical scheme, the user may need to select the to-be-operated object and draw the input track on the electronic apparatus via touch input, mouse click or slide input. The electronic apparatus may determine the operation type corresponding to the input track and execute the operation corresponding to the operation type to interact with the application after the electronic apparatus detects that the input track ends.

It can be seen that the above technical scheme may provide a new interaction method. With this interaction method, the user needs not to search for the function icon or button corresponding to the operation. The user may need to input a track corresponding to a wished function operation via touch input on the touch screen or via the mouse. Therefore, this technical scheme may solve the problem that the user may select the function icon via multiple click and search operations.

Furthermore, with this technical scheme, the corresponding relationship between the input track and the function may need to be pre-set on the electronic apparatus or in the application and the function icon or button may not need to be set on the interface. Therefore, the interface which is simple and is easy to operate may be provided for the user. Furthermore, it may be convenient for extending the application to implement more functions.

Following embodiments may be described hereinafter taking the micro-blog application installed on the electronic device for example.

Figure 2:
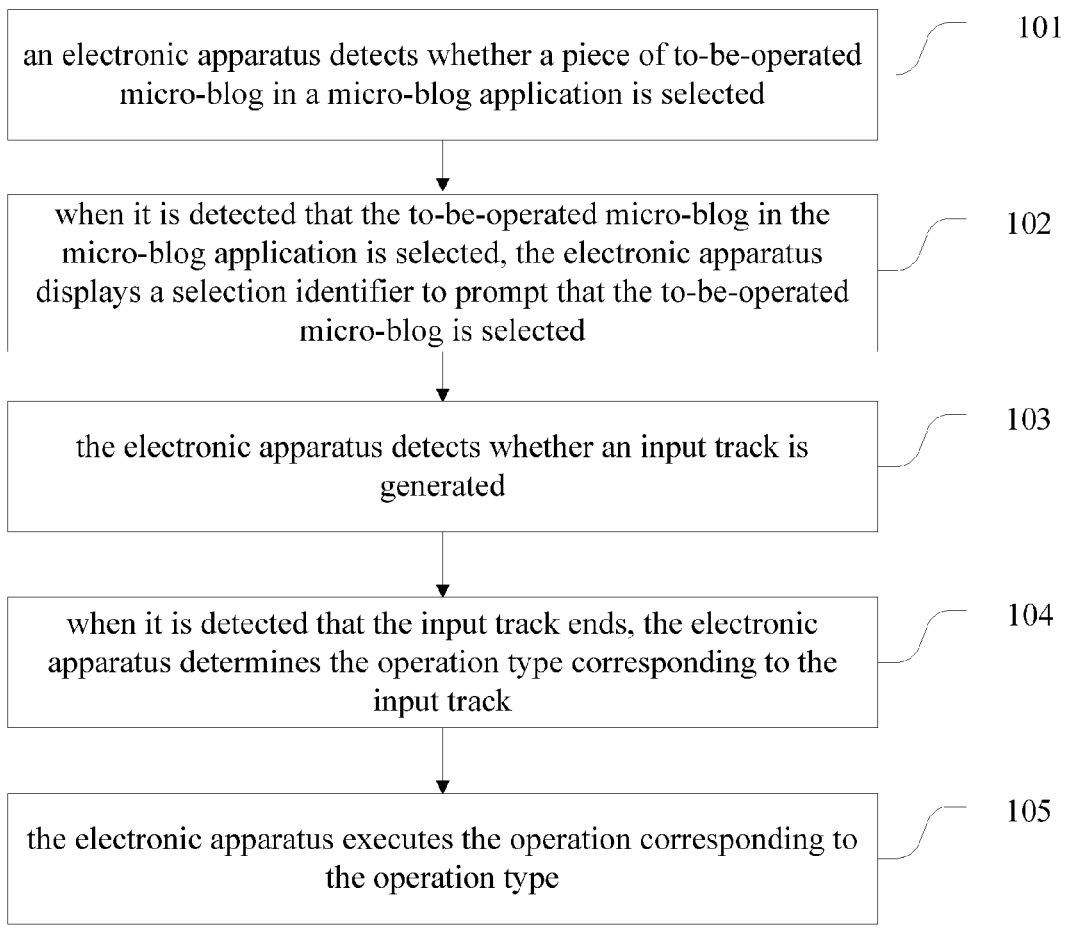
FIG. 2 is a flow chart illustrating a method for interacting with a micro-blog application in an electronic apparatus in accordance with various embodiments of the present disclosure.

As shown in FIG. 2, an embodiment of the present disclosure may provide a method for interacting with the micro-blog application in the electronic device. The method may include following blocks.

In block 101, an electronic apparatus may detect whether a piece of to-be-operated micro-blog in a micro-blog application is selected.

A user may long press the to-be-operated micro-blog on a touch screen to select this piece of micro-blog. In another example, the user may click the to-be-operated micro-blog to select this piece of micro-blog via a mouse connected with the electronic apparatus.

In block 102, when it is detected that the to-be-operated micro-blog in the micro-blog application is selected, the electronic apparatus may display a selection identifier to prompt that the to-be-operated micro-blog is selected.

Figure 3:
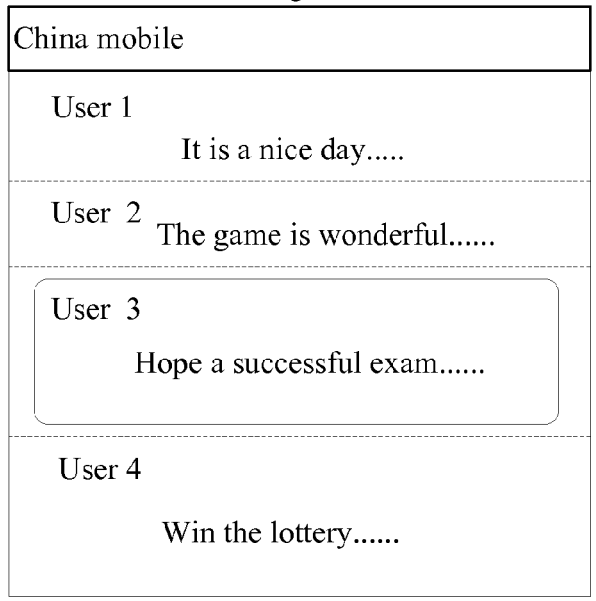
FIG. 3 is a diagram illustrating a first display interface of a micro-blog application in accordance with various embodiments of the present disclosure.

For instance, in the display interface of the micro-blog application shown in FIG. 3, a dotted line may represent a boundary of micro-blog applications of different users (The display interface of the micro-blog application may not include the dotted line). When the user selects the micro-blog application of the user in the display interface, a rectangle may be displayed outside this piece of micro-blog to denote that the user has selected this piece of micro-blog.

The electronic apparatus may display the selection identifier in an area, at which the selected to-be-operated micro-blog may be located. The selection identifier may not be limited to the rectangle and may be in other formats, such as, a circle and highlighted words in the selected micro-blog. The selection identifier for apparently distinguishing the selected micro-blog and un-selected micro-blog may be used, which may not be limited here.

In block 103, the electronic apparatus may detect whether an input track is generated.

The input track may be a track generated by touch input on the electronic apparatus. In another example, the input track may be a track generated by click and slide input on the electronic apparatus with the mouse.

Each input track may correspond to one operation type.

Taking the micro-blog application for example, the operation type may be repost, comment, bookmark and report, etc.

The corresponding relationship between the input track and the operation type may be pre-set by a technical person developing the application in a development and design phase of the application. After the application is installed in the electronic device, the corresponding relationship between the input track and the operation type may be stored in an installation directory corresponding to the application. In another example, the user may manually configure the corresponding relationship between the input track and operation type for each operation type of the application and the corresponding relationship may be stored in the electronic apparatus.

The input track may be: a direction track, pattern track or customized track.

The direction track may include: an upward track, a downward track, leftward track, rightward track, upper leftward track, down leftward track, upper rightward track or down rightward track.

The pattern track may include: a check mark, circle, alphabetic character, figure or word.

The customized track may be a track customized by the user in the electronic device.

It should be noted that the above input track may be generated by click and slide input with the mouse or touch input on any position of the display screen on the electronic device.

In block 104, when it is detected that the input track ends, the electronic apparatus may determine the operation type corresponding to the input track.

In block 105, the electronic apparatus may execute the operation corresponding to the operation type on the to-be-operated micro-blog.

Taking the micro-blog application for example, the preset corresponding relationship between the input tracks and the operation types may be as follows.
1) leftward track—bookmark
2) rightward track—repost
3) down rightward track—report
4) down leftward track—comment.

When a user selects a piece of micro-blog and a leftward track is input via the touch input, the electronic apparatus may determine that the operation type is bookmark according to the preset corresponding relationship between the input track and the operation type.

In another implementation mode provided by this embodiment of the present disclosure, before detecting that the input track ends, the to-be-operated object in the rectangle may be moved according to the input track. When it is detected that the input track ends, after the electronic apparatus determines the operation type corresponding to the input track, this embodiment may further include: displaying an operation identifier corresponding to the operation type. When it is determined that the input track ends and the last touch point of the input track disappears, the to-be-operated object in the rectangle may be placed in an initial position.

Figure 4:
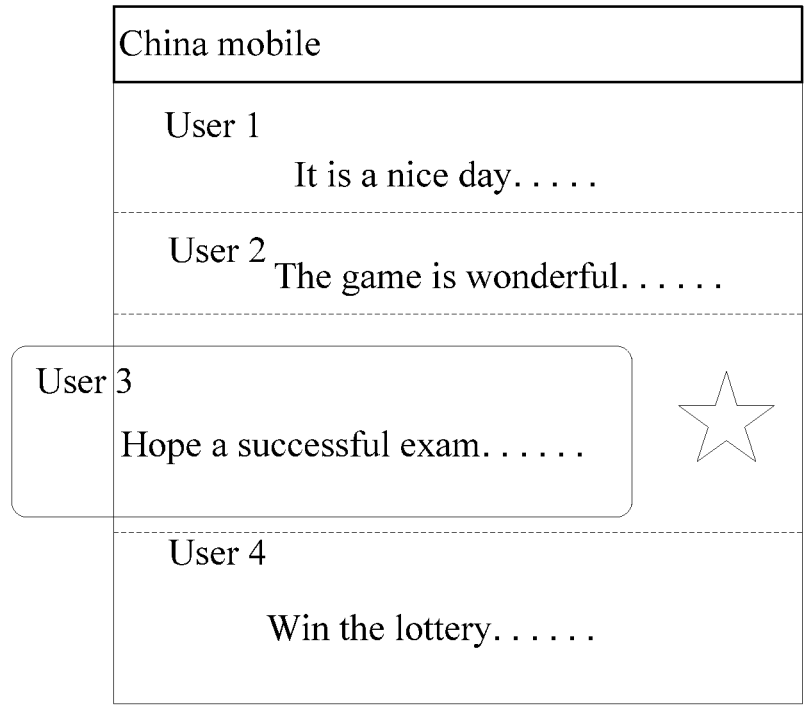
FIG. 4 is a diagram illustrating a second display interface of a micro-blog application in accordance with various embodiments of the present disclosure.

As shown in FIG. 4, when the user selects a piece of micro-blog and the leftward track is input via the touch input, the micro-blog in the rectangle may be moved to the left with the leftward track (In practice, the part moving out of the screen from the left side of the screen may not be displayed. In order to clearly show the movement of the micro-blog in the rectangle, the part moving out of the screen is displayed.). When it is detected that the input track ends (Then, the finger of the user or the touch pen is touching the touch screen and the input track ends), after the electronic apparatus determines that the operation type corresponding to the input track is bookmark, the operation identifier "star" corresponding to the bookmark may be displayed on the right of the rectangle. As shown in FIG. 4, when leftward track input by the user ends and the last touch point of the input track disappears (for instance, the finger of the user leaves the touch screen or the touch pen used by the user leaves the touch screen), the micro-blog in the rectangle may be placed in the initial position (i.e., the position of the micro-blog before the movement).

The display position of the operation identifier corresponding to the operation type may not be limited in this embodiment of the present disclosure.

In another embodiment of the present disclosure, after the electronic apparatus executes the operation corresponding to the operation type, this embodiment may further include: displaying an identifier indicating that the operation corresponding to the operation type is finished.

Figure 5:
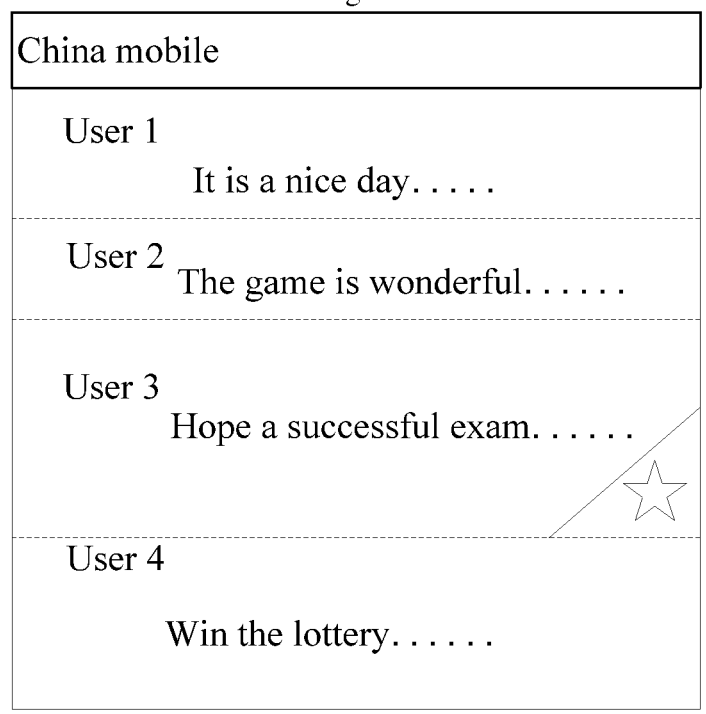
FIG. 5 is a diagram illustrating a third display interface of a micro-blog application in accordance with various embodiments of the present disclosure.

As shown in FIG. 5, there may be a triangle in the lower right corner of this micro-blog. A "star" identifier may be displayed in this triangle to prompt that the micro-blog has been bookmarked.

It should be understood that since implementation processes of different operation types are different, the operations executed in block 105 may be different.

Some operations may have a feature of two-way operation. For instance, as for the bookmark mentioned above, this bookmark operation may have the feature of the two-way operation. That is, if the status of the current micro-blog is "not bookmarked", after the leftward track is input by the user via the touch input, the above block 105 may execute the operation for adding a bookmark. Accordingly, the displayed identifier denoting that the operation corresponding to the operation type is finished may be a star filled with a color. Whereas, if the current status of the micro-blog is "bookmarked", after the leftward track is input by the user via the touch input, the operation executed in the above block 105 may be cancelling the bookmark. Accordingly, the displayed identifier indicating that the operation corresponding to the operation type has been finished may be a star, which is not filled out.

Some operations may have a feature of one-way operation. As for the report operation in the micro-blog, when the down rightward track is input by the user via the touch input, the above block 105 may execute the report operation.

Some operations may call the input interface to finish the whole operation. As for the comment operation in the microblog, when the down leftward track is input by the user via the touch input, the above block 105 may call and display the input interface to prompt that the comment operation executed by the user may have been finished.

With the above technical scheme, the user selects the to-be-operated object and the input track may be drawn on the electronic apparatus via the mouse click and slide input or the touch input. When the electronic apparatus detects that the input track ends, the operation type corresponding to the input track may be determined and the operation corresponding to the operation type may be executed to interact with the application.

It can be seen that the above technical scheme may provide a new interaction method. With this method, the user may need not to search for the function icon or button corresponding to the operation and may input the track corresponding to the wished function operation on the touch screen via touch input or mouse input. This technical scheme may solve the problem that since an application may provide too many function icons or buttons, when all of these function icons or buttons cannot be displayed on the first-level menu of the display interface of the application, the user can select the needed function icon via multiple click and search operations.

Furthermore, with this technical scheme, the corresponding relationship between the input track and the function may need to be pre-set on the electronic apparatus or in the application and the function icon or button may not need to be set on the interface. Therefore, the interface which is simple and easy to operate may be provided for the user. Furthermore, it may be convenient for extending the application to implement more functions.

Figure 6:
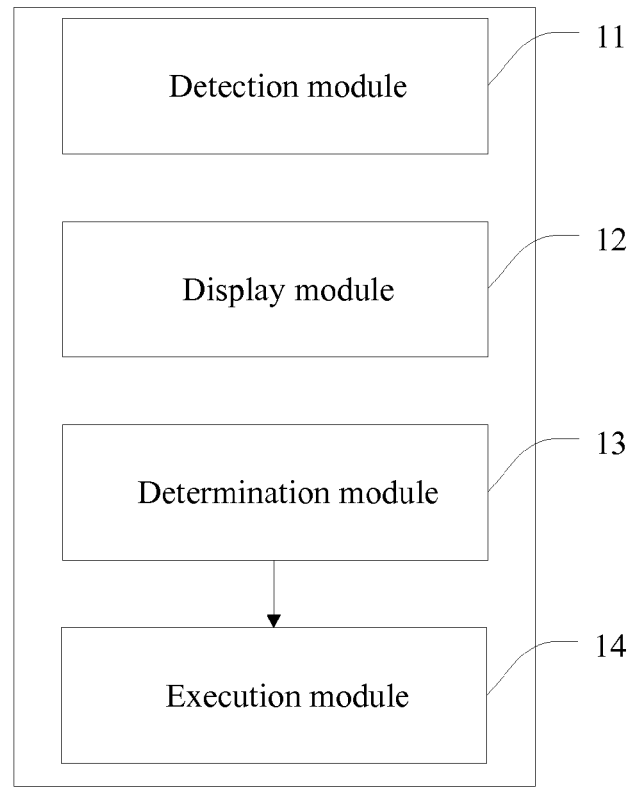
FIG. 6 is a diagram illustrating structure of an electronic apparatus in accordance with various embodiments of the present disclosure.

As shown in FIG. 6, an embodiment of the present disclosure may provide an electronic apparatus. The electronic apparatus may include: a detection module 11, a display module 12, a determination module and an execution module 14.

The detection module 11 may be configured to detect whether a to-be-operated object in an application is selected.

The display module 12 may be configured to display a selection identifier when it is detected that the to-be-operated object of the application is selected to prompt that the to-be-operated object has been selected.

The detection module 11 may be further configured to detect whether an input track has been generated.

The determination module 13 may be configured to determine an operation type corresponding to the input track when it is detected that the input track ends.

The execution module 14 may be configured to execute an operation corresponding to the operation type.

In this embodiment, the user selects the to-be-operated object and the input track may be drawn on the electronic via the mouse click and slide input or the touch input. When the electronic apparatus detects that the input track ends, the operation type corresponding to the input track may be determined and the operation corresponding to the operation type may be executed to interact with the application.

It can be seen that the above technical scheme may provide a new interaction method. With this interaction method, the user needs not to search for the function icon or button corresponding to the operation. The user may need to input a track corresponding to a wished function operation via touch input on the touch screen or via the mouse. This technical scheme may solve the problem that since an application may provide too many function icons or buttons, when all of these function icons or buttons cannot be displayed on the first-level menu of the display interface of the application, the user can select the needed function icon via multiple click and search operations.

Furthermore, with this technical scheme, the corresponding relationship between the input track and the function may need to be pre-set on the electronic apparatus or in the application and the function icon or button may not need to be set on the interface. Therefore, the interface which is simple and easy to operate may be provided for the user. Furthermore, it may be convenient for extending the application to implement more functions.

Each input track may correspond to one operation type.

The input track may be: a direction track, pattern track or customized track. The direction track may include: an upward track, a downward track, leftward track, rightward track, upper leftward track, down leftward track, upper rightward track or down rightward track. The pattern may include: a check mark, circle, alphabetic character, figure or word. The customized track may be a track customized by the user in the electronic device.

In practice, the determination module 13 may be further configured to search for the operation type using the input track according to a pre-stored corresponding relationship between the input track and the operation type.

In an embodiment of the present disclosure, the display module 12 may be further configured to draw and display a rectangle outside an area of the selected to-be-operated object when it is detected that the to-be-operated object in the application is selected.

Figure 7:
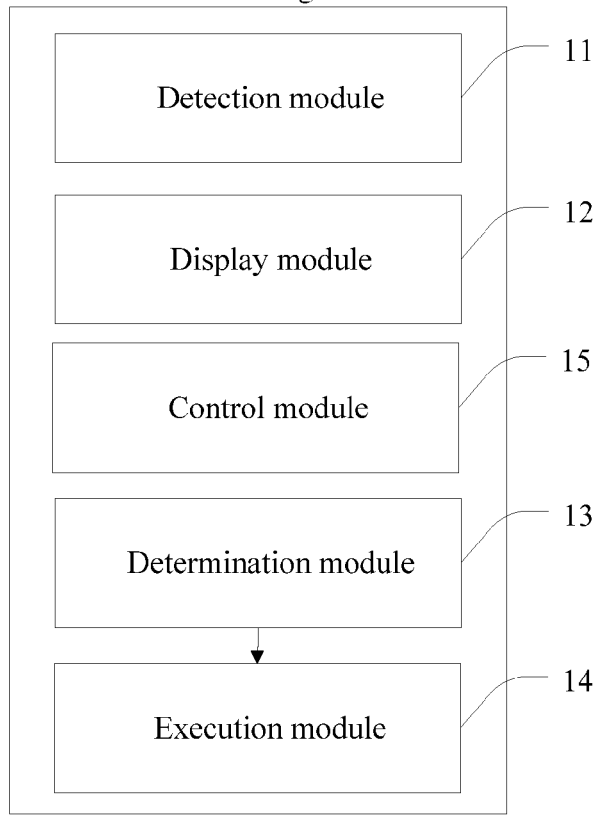
FIG. 7 is a diagram illustrating structure of another electronic apparatus in accordance with various embodiments of the present disclosure.

In an embodiment of the present disclosure, as shown in FIG. 7, the electronic apparatus may further include: a control module 15, configured to move the to-be-operated object in the rectangle according to the input track before the detection module 11 detects that the input track ends.

The control module 15 may be further configured to place the moved to-be-operated object in an original position when the detection module 11 detects that the input track ends and the last touch point of the input track disappears.

In an embodiment of the present disclosure, when the display module 12 detects the input track ends and the determination module 13 determines the operation type corresponding to the input track, the display module 12 may be further configured to display an operation identifier corresponding to the operation type.

In an embodiment of the present disclosure, the display module 12 may be further configured to display an identifier denoting that the operation corresponding to the operation type has been finished.

In this embodiment, the electronic apparatus may be an apparatus with a touch screen, such as a mobile phone, a tablet PC, a Media Player 4 (MP4) and a vehicle-mounted terminal. The electronic device may support input of a user via the touch screen. The electronic apparatus may be a desktop computer. The desktop computer may have a mouse access interface and support input of the user via a mouse.

The application may be Instant Messaging (IM), a microblog application, E-mail, a Social Networking Site (SNS) or an application adopting Really Simple Syndication (RSS), etc.

An embodiment of the present disclosure may further provide a machine readable storage medium for storing instructions executed by a machine to execute the method for interacting with the application. A system or apparatus with the storage medium may be provided. The storage medium may store software program codes for implementing the function of any of the above embodiments. The computer (or CPU or MPU) of the system or the apparatus may read and execute the software program codes stored in the storage medium.

In this situation, the software program codes read from the storage medium may be used for implementing the function of any of the above embodiments. Therefore, the software program codes and the storage medium storing the software program codes may be part of the technical scheme of the present disclosure.

In this embodiment, the storage medium providing the software program codes may include: a floppy, hardware, Compact Disc (CD), an optical drive (such as a Compact Disc Read-Only Memory (CD-ROM), CD-Recordable (CD-R), CD-Re-Writable (CD-RW), Digital Video Disc-Read Only Memory (DVD-ROM), DVD-Random Access Memory (CD-RAM), DVD-Re-Writable (DVD-RW)), tape, non-volatile memory card and Read-Only Memory (ROM). In another example, the communication network may download the software program codes from the computer acting as a server.

It should be noted that the computer may read the software program codes and the OS (Operating System) running on the computer may implement all or partial of the operations via the instructions based on the software program codes to implement the function of any of the above embodiments.

It should be noted that the software program codes read by the storage medium may be written into the storage set in an expansion board inserted into the computer or written into the storage set in an expansion unit connected with the computer. The CPU installed in the expansion board or the expansion unit may execute partial or all actual operations based on the instructions of the software program codes to implement the function of any of the above embodiment.

What has been described and illustrated herein are embodiments of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for interacting with an application in an electronic apparatus, comprising:
    detecting, by an electronic apparatus, whether a to-be-operated object in an application is selected;
    displaying, by the electronic apparatus, a selection identifier when the electronic apparatus detects that the to-be-operated object in the application is selected;
    detecting, by the electronic apparatus, whether an input track is generated;
    determining, by the electronic apparatus, an operation type corresponding to the input track when the electronic apparatus detects the input track and detects that the input track ends, wherein determining includes searching for, by the electronic apparatus, the operation type using the input track according to a corresponding relationship between the input track and the operation type;
    operating, by the electronic apparatus, the to-be-operated object according to the operation type; moving the to-be-operated object according to the input track before the electronic apparatus detects that the input track ends;
    placing the to-be-operated object in an original position when the electronic apparatus detects that the input track ends and the last touch point of the input track disappears; and
    displaying an operation identifier corresponding to the operation type, wherein if the electronic apparatus operated the to-be-operated object according to the operation type, displaying an identifier denoting that an operation corresponding to operation type is finished.

2. The method according to claim 1, wherein
    one input track corresponds to one operation type;
    the input track comprises: a direction track, pattern track or customized track;
    the direction track comprises: an upward track, a downward track, leftward track, rightward track, upper leftward track, down leftward track, upper rightward track or a down rightward track;
    the pattern track comprises: a check mark, a circle, an alphabetic character, a figure or a word; and
    the customized track comprises: a track customized by the user in the electronic apparatus.

3. The method according to claim 1, wherein displaying the selection identifier when the electronic apparatus detects that the to-be-operated object in the application is selected comprises:
    drawing and displaying, by the electronic apparatus, a rectangle outside an area of the to-be-operated object when the electronic apparatus detects that the to-be-operated object in the application is selected.

4. The method according to claim 1, wherein
    the input track is input by a user on a touch screen of the electronic apparatus via touch input; or
    the input track is input by the user on the touch screen of the electronic apparatus via a mouse connected with the electronic apparatus.

5. The method according to claim 1, wherein
    the corresponding relationship between the input track and the operation type is preset by a technical person developing the application in a development and design phase and stored in an installation directory corresponding to the application after the application is installed in the electronic apparatus; or
    the corresponding relationship between the input track and the operation type is generated by the user via manually configuring each operation type of the application and stored in the electronic apparatus.

6. An electronic device, comprising:
    a processing module including a processor;
    a detection module, to detect whether a to-be-operated object in an application is selected and detect whether an input track is generated;
    a display module, to display a selection identifier when the detection module detects that the to-be-operated object in the application is selected, the display module displaying an operation identifier corresponding to an operation type;
    a determination module, to determine an operation type corresponding to the input track when the detection module detects the input track and detects that the input track ends, the determination module searching for the operation type using the input track according to a corresponding relationship between the input track and the operation type;
    an execution module, to operate the to-be-operated object according to the operation type; and
    a control module, to move the to-be-operated object according to the input track before the detection module detects that the input track ends and place the to-be-operated object in an original position when the detection module detects that the input track ends and the last touch point of the input track disappears,
    wherein after the electronic device operated the to-be-operated object according to the operation type, the display module displays an identifier denoting that an operation corresponding to operation type is finished.

7. The electronic device according to claim 6, wherein one input track corresponds to one operation type;
the input track comprises: a direction track, pattern track or customized track;
the direction track comprises: an upward track, a downward track, leftward track, rightward track, upper leftward track, down leftward track, upper rightward track or a down rightward track;
the pattern track comprises: a check mark, a circle, an alphabetic character, a figure or a word; and
the customized track comprises: a track customized by the user in the electronic device.

8. The electronic device according to claim 6, wherein the display module is further to draw and display a rectangle outside an area of the to-be-operated object when the detection module detects that the to-be-operated object in the application is selected.

9. The electronic device according to claim 6, wherein the input track is input by a user on a touch screen of the electronic device via touch input; or
the input track is input by the user on the touch screen of the electronic device via a mouse connected with the electronic device.

10. The electronic device according to claim 6, wherein the corresponding relationship between the input track and the operation type is preset by a technical person developing the application in a development and design phase and stored in an installation directory corresponding to the application after the application is installed in the electronic device; or
the corresponding relationship between the input track and the operation type is generated by the user via manually configuring each operation type of the application and is stored in the electronic apparatus.

* * * * *